United States Patent
Gould et al.

(10) Patent No.: US 9,527,267 B2
(45) Date of Patent: *Dec. 27, 2016

(54) DELIVERY TUBE FOR IRRIGATION AND FERTILIZATION SYSTEM AND METHOD FOR MANUFACTURING SAME

(71) Applicant: Responsive Drip Irrigation, LLC, Bradenton, FL (US)

(72) Inventors: Janice K Gould, Bradenton, FL (US); David A Conklin, Bradenton, FL (US)

(73) Assignee: Responsive Drip Irrigation, LLC, Bradenton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/625,572

(22) Filed: Feb. 18, 2015

(65) Prior Publication Data

US 2015/0156975 A1   Jun. 11, 2015

Related U.S. Application Data

(63) Continuation-in-part of application No. 13/968,447, filed on Aug. 16, 2013, now Pat. No. 9,309,996.

(51) Int. Cl.
| | |
|---|---|
| *B32B 37/00* | (2006.01) |
| *B32B 38/00* | (2006.01) |
| *A01G 25/02* | (2006.01) |
| *B29C 65/08* | (2006.01) |
| *B29C 65/00* | (2006.01) |

(Continued)

(52) U.S. Cl.
CPC ....... *B32B 37/0076* (2013.01); *B32B 38/0004* (2013.01); *A01G 25/02* (2013.01); *B29C 65/02* (2013.01); *B29C 65/08* (2013.01); *B29C 66/1122* (2013.01); *B29C 66/133* (2013.01); *B29C 66/21* (2013.01); *B29C 66/232* (2013.01); *B29C 66/432* (2013.01); *B29C 66/71* (2013.01); *B29C 66/712* (2013.01); *B29C 66/7294* (2013.01); *B29C 66/73172* (2013.01); *B29C 66/83411* (2013.01); *B29C 2793/009* (2013.01); *B29L 2031/7004* (2013.01); *B32B 2307/728* (2013.01); *B32B 2325/00* (2013.01); *B32B 2386/00* (2013.01); *B32B 2597/00* (2013.01)

(58) Field of Classification Search
USPC .......................................................... 405/36
See application file for complete search history.

(56) References Cited

U.S. PATENT DOCUMENTS

| | | |
|---|---|---|
| 3,271,223 A | 9/1966 | Sudo |
| 3,442,740 A | 5/1969 | David |
| 3,830,067 A | 8/1974 | Osborn et al. |

(Continued)

FOREIGN PATENT DOCUMENTS

| | | |
|---|---|---|
| AU | 2011224135 | 10/2011 |
| WO | 2008103787 | 8/2008 |

*Primary Examiner* — Benjamin Fiorello
*Assistant Examiner* — Kyle Armstrong
(74) *Attorney, Agent, or Firm* — Law Office of Steven R. Olsen, PLLC; Steven R. Olsen (57) ABSTRACT

The invention is directed generally to improvements in irrigation and fertilization assessment and delivery. More specifically, embodiments of the invention provide an improved fluid delivery tube, method to manufacture such tube, and systems that include such tube. The delivery tube is beneficial at least because it minimizes the life cycle cost of a responsive delivery tube.

15 Claims, 8 Drawing Sheets

(51) Int. Cl.
*B29C 65/02* (2006.01)
*B29L 31/00* (2006.01)

(56) References Cited

U.S. PATENT DOCUMENTS

| | | |
|---|---|---|
| 3,939,875 A | 2/1976 | Osborn et al. |
| 3,945,873 A | 3/1976 | Osborn |
| 3,996,968 A * | 12/1976 | Bergman .............. F16L 11/121 138/103 |
| 6,372,096 B1 | 4/2002 | Ditzler |
| 7,198,431 B2 | 4/2007 | Gesser |
| 7,712,253 B2 | 5/2010 | Gesser et al. |
| 7,748,930 B2 | 7/2010 | Gesser et al. |
| 8,011,852 B2 | 9/2011 | Gesser et al. |
| 8,011,853 B2 | 9/2011 | Gesser et al. |
| 8,091,276 B2 | 1/2012 | Gesser et al. |
| 8,312,671 B2 | 11/2012 | Sinda |
| 2003/0201345 A1 | 10/2003 | Jeong |
| 2006/0193695 A1 | 8/2006 | Ranjan et al. |
| 2006/0272726 A1 | 12/2006 | Golan et al. |
| 2010/0170961 A1 | 7/2010 | Sinda |
| 2010/0218828 A1 | 9/2010 | Sinda |
| 2011/0179705 A1 | 7/2011 | Sinda |
| 2011/0179709 A1 | 7/2011 | Sinda |
| 2011/0179710 A1 | 7/2011 | Sinda |
| 2011/0265897 A1 | 11/2011 | Sinda |
| 2012/0102833 A1 | 5/2012 | Gesser et al. |
| 2013/0206251 A1 * | 8/2013 | Harr ...................... F16N 31/006 137/312 |
| 2014/0047766 A1 | 2/2014 | LaRue et al. |

* cited by examiner

DELIVERY TUBE FOR IRRIGATION AND FERTILIZATION SYSTEM AND METHOD FOR MANUFACTURING SAME

CROSS-REFERENCE TO RELATED APPLICATIONS

This is a Continuation-in-Part (CIP) of U.S. application Ser. No. 13/968,447, which was filed on Aug. 16, 2013.

BACKGROUND

1. Field of the Invention

The invention relates generally to irrigation and fertilization systems and methods, and more particularly, but without limitation, to an improved delivery tube that can more-efficiently satisfy plant hydration and nutrition needs.

2. Description of the Related Art

Agronomic practices include various irrigation and fertilization assessment and delivery methods. Typically, growers measure environmental conditions (i.e. rainfall, soil moisture, pH, temperature, etc.) and/or observe plant development to determine an amount of water and fertilizer to apply during a plant's growing season. Well-known methods also exist for providing the irrigation and fertilization; for instance, sprinkler systems and drip lines are commonly utilized.

Conventional assessment methods and delivery systems have many shortcomings, however. For example, assessment methods that rely on data measurements and observations to estimate plant needs are reactive. Accordingly, such methods necessarily introduce a time delay between the assessment and the delivery of the water and fertilizer. Sufficiently long delays can stress the target plants and/or decrease the value of the assessment (since the measured conditions may quickly change). In addition, such assessments often lack geographical precision, which may be disadvantageous, for instance, where moisture conditions vary substantially within a crop field due to changes in elevation or other factors.

Even if the needs assessment is correct, timely, and sufficiently precise, conventional irrigation and fertilization delivery systems often fail to provide the desired level of water and/or nutrients to each plant. There are many reasons for this. For example, in an irrigation system, static water pressure can vary based on distance from the water source, field topography, and/or leaks or other component failure. Distributed controls that would overcome such system limitations, and also enable delivery of water and nutrients according to the demand of each plant, are generally cost prohibitive. As a result, many delivery systems apply too little or too much water and nutrients. This decreases crop yield. The application of too much water is a waste of a precious natural resource; the application of too much fertilizer can harm the environment.

Given the importance of food supply, water management, and the need to protect the environment, improvements in irrigation and fertilization assessment and delivery methods are urgently needed.

SUMMARY OF THE INVENTION

Embodiments of the invention seek to overcome one or more of the aforementioned limitations with an improved delivery tube, method to manufacture such tube, and/or systems that include such tube.

An embodiment of the invention provides a delivery tube that includes: a substrate, no portion of the substrate being treated with a hydrophilic polymer; and a backer coupled to the substrate at a first weld and a second weld, no portion of the backer being treated with the hydrophilic polymer, the delivery tube being configured such that the substrate and the backer are each disposed along a functional length of the delivery tube.

An embodiment of the invention provides a delivery tube that includes a substrate, at least a portion of the substrate being treated with a hydrophilic polymer; and a backer coupled to the substrate, no portion of the backer being treated with the hydrophilic polymer, the delivery tube being configured such that the substrate and the backer are each disposed along a functional length of the delivery tube, the substrate and the backer each including Dupont Tyvek.

An embodiment of the invention provides a delivery tube that includes a substrate, a first portion of the substrate being treated with a hydrophilic polymer, a second portion and a third portion of the substrate not being treated with the hydrophilic polymer; and a backer welded to the second portion and the third portion of the substrate, the delivery tube being configured such that the substrate and the backer are each disposed along a functional length of the delivery tube.

BRIEF DESCRIPTION OF THE DRAWINGS

The invention will be more fully understood from the detailed description below and the accompanying drawings, wherein.

DETAILED DESCRIPTION

Embodiments of the invention will be described more fully with reference to FIGS. 1 to 14, in which embodiments of the invention are shown. This invention may, however, be embodied in many different forms and should not be construed as limited to the embodiments set forth herein. The sub-headings below are for organizational convenience only, and features of the invention may be described anywhere in this specification. In the drawings, physical features are not necessarily rendered to scale. Where identical reference numbers are repeated, they refer to the same or substantially similar features.

Exemplary Systems

Figure 1:
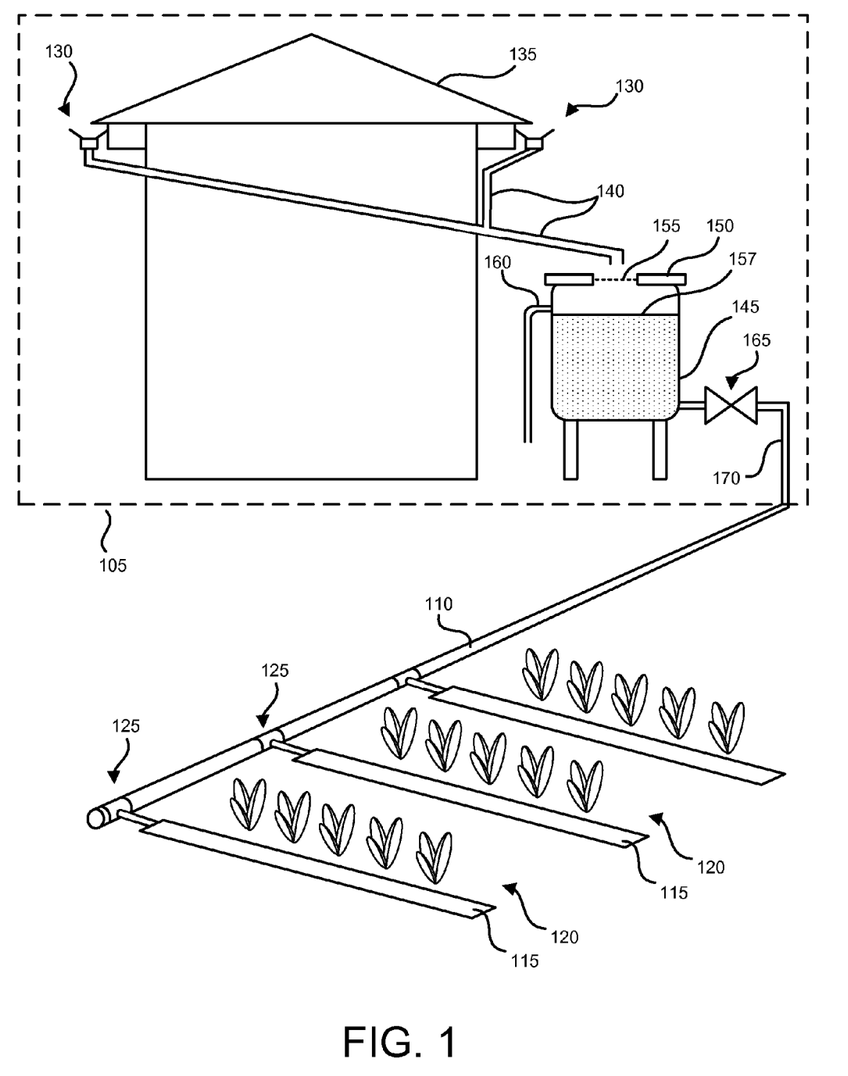
FIG. 1 is a schematic diagram of an irrigation and fertilization system, according to an embodiment of the invention.

Embodiments of the invention can be used on farms of varying scale. FIG. 1 is a schematic diagram of an irrigation and fertilization system, according to an embodiment of the invention. The embodiment illustrated in FIG. 1 might be applicable, for instance, to a family farm or other small plot. As shown therein, a small plot supply system 105 is configured to harvest rain water. The small plot supply system 105 feeds a header pipe 110 that is coupled to multiple delivery tubes 115 via fittings 125. Crops 120 are disposed adjacent to each of the delivery tubes 115.

The small plot supply system 105 includes roof gutters 130 positioned to cooperate with a roof 135. Downspouts 140 are coupled to the gutters 130 at an input end and disposed over a storage tank 145 at an output end. The storage tank 145 could be or include, for instance, and elevated plastic 55-gallon drum. The storage tank 145 is configured with a lid 150 having a screen filter 155. The storage tank 145 further includes an overflow outlet 160. An isolation valve 165 is disposed inline between the storage tank 145 and a supply system output 170.

Preferably, each delivery tube 115 includes a responsive portion along its length that is hydrophilic and configured to deliver water or an aqueous solution in response to surfactant root exudate from a root system of the crops 120. In other words, each section of each delivery tube 115 is configured to efficiently deliver water or other solution according to individual crop demand rather than at a regulated rate provided, for example, by sprinkler and drip-based irrigation systems.

As used herein, the term "delivery tube" refers generally to a device for fluid conveyance along a length of the delivery tube and through at least a portion of its walls, and is not intended to restrict the physical form of such device to one having a circular cross-section. For instance, in embodiments of the invention the delivery tubes 115 are "tape-like" with a relatively flat cross-section when unfilled with a fluid. Alternative configurations for the delivery tubes 115 are described in more detail below with reference to FIGS. 3-8.

During periods of rain, the gutters 130 and downspouts 140 direct rain water to the storage tank 145. The screen filter 155 filters solid particles from the rain water as it enters the storage tank 145. If water in the storage tank 145 exceeds a predetermined maximum water level 157, excess water is discharged from the storage tank 145 via the overflow outlet 160.

The size of storage tank 145 and the change in elevation between the maximum water level 157 and the supply system output 170 determine a maximum pressure provided by the small plot supply system 105. In embodiments of the invention, the desired pressure at the supply system output 170 is relatively low, for instance within the range of 0.5-2.1 $lb/in^2$ (PSI), for compatibility with the delivery tubes 115. The desired pressure at the supply system output 170 will vary accordingly to the particular configuration of the delivery tubes 115, however.

The isolation valve 165 could be closed, for instance, during periods of rain (when the crops 120 are unlikely to need hydration) or during maintenance of the downstream irrigation system. When the isolation valve 165 is open, the header pipe 110 supplies rain water to pressurize the delivery tubes 115. Once pressurized, the delivery tubes 115 supply the filtered rain water to the crops 120 in response to the root exudates.

Variations to the system illustrated in FIG. 1 and described above are possible. For example, in alternative embodiments, the small plot supply system 105 may further include a well water feed and/or municipal water feed to supplement the rain-harvesting features in filling the storage tank 145. Such additional feed(s) could be activated, for example, by a float valve in the storage tank 145. There could be more than one storage tank 145 coupled to the supply system output 170. In addition, one of more filters could be placed in-line between the storage tank(s) 145 and the supply system output 170 in addition to, or instead of, the screen filter 155. In alternative embodiments, the small plot supply system 105 includes a fertilizer injection subsystem. End caps and flush valves are not shown in FIG. 1 but are preferably coupled to the header 110. Likewise, each of the delivery tubes 115 may be crimped or capped at a terminal end; alternatively, multiple delivery tubes may be joined by a footer and such footer may include end caps and/or a flush valve.

Figure 2:
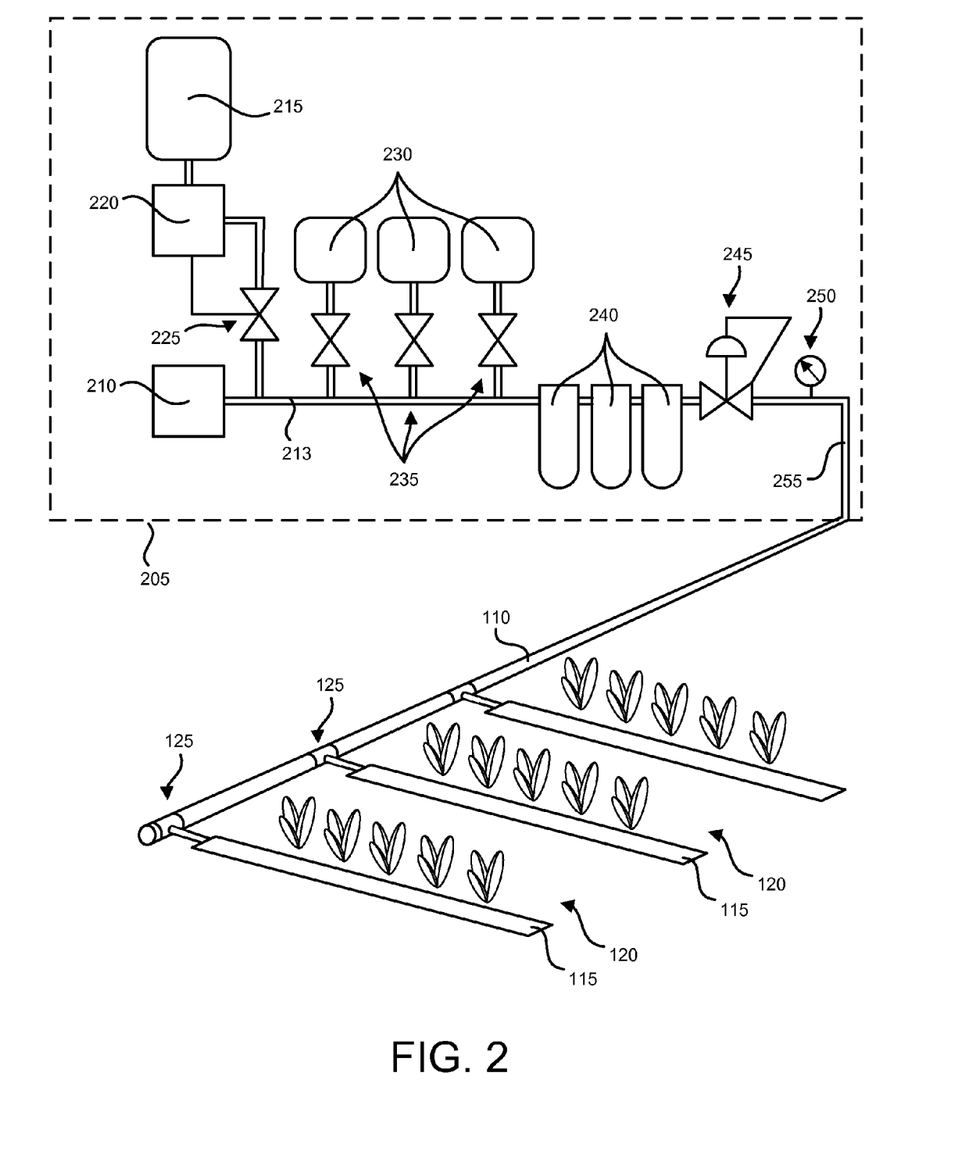
FIG. 2 is a schematic diagram of an irrigation and fertilization system, according to an embodiment of the invention.

FIG. 2 is a schematic diagram of an irrigation and fertilization system, according to an embodiment of the invention. The embodiment illustrated in FIG. 2 might be applicable, for instance, to a large commercial farming operation. As shown therein, a commercial grower supply system 205 feeds a header pipe 110 that is coupled to multiple delivery tubes 115 via fittings 125. Crops 120 are disposed adjacent to each of the delivery tubes 115.

The commercial grower supply system 205 includes a well pump 210 coupled to a source line 213. A fertilizer reservoir 215 is also coupled to the source line 213 via a pump 220 and metering valve 225. Each of multiple chemical injection tanks 230 are connected to the source line 213 via a corresponding metering valve 235. Filters 240, pressure regulator 245, and pressure meter 250 are disposed in series between the source line 213 and a system supply output 255. The commercial grower supply system 205 feeds a header pipe 110 that is coupled to multiple delivery tubes 115 via fittings 125. Crops 120 are disposed adjacent to each of the delivery tubes 115.

The pressure regulator 245 is configured to output a relatively low-pressure regulated fluid flow, for instance for a setting within the range of 0.5-2.1 PSI, for compatibility with the delivery tubes 115. An exemplary regulator 245 is the Model 102 diaphragm regulator manufactured by Ziggity Systems, Inc. The desired pressure setting for such an adjustable pressure regulator will vary accordingly to the particular configuration of the delivery tubes 115. In alternative embodiments, other pressure settings and/or other regulators 245 could be used.

In operation, the commercial grower supply system 205 supplies filtered water or a filtered aqueous solution including fertilizer and/or chemicals at a predetermined (and relatively low) pressure via a header pipe 110 to delivery tubes 115. The pressurized delivery tubes 115 supply the water or aqueous solution including soluble fertilizers in response to root exudates from the crops 120.

Variations to the system illustrated in FIG. 2 and described above are possible. For example, in alternative embodiments, the commercial grower supply system 205 could include a municipal water feed to supplement the water supply from the well pump 210. The commercial grower supply system 205 may not include the chemical injection tanks 230 and associated metering valves 235. Moreover, the type and quantity of filters 240 could vary, according to design choice. An isolation valve could be included, for instance between the pressure meter 250 and the supply system output 255. End caps and flush valves are not shown in FIG. 1 but are preferably coupled to the header 110. Likewise, each of the delivery tubes 115 may be crimped or capped at a terminal end; alternatively, multiple delivery tubes may be joined by a footer, and such footer may include end caps and/or a flush valve.

Delivery Tubes

Figure 3:
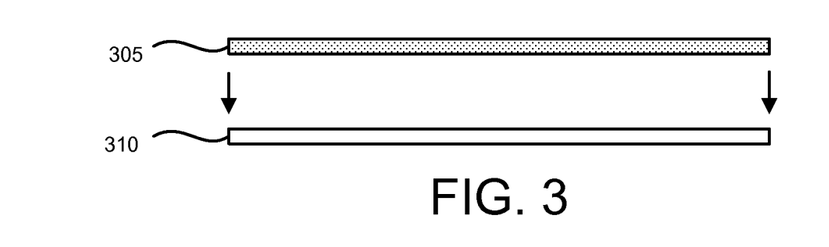
FIG. 3 is an assembly view of a delivery tube, illustrated in cross-section, according to an embodiment of the invention.

Alternative configurations of the delivery tubes 115 are described below with reference to FIGS. 3-8. FIG. 3 is an assembly view of a delivery tube, illustrated in cross-section, according to an embodiment of the invention. As shown therein, an embodiment of the delivery tube 115 is generally an assembly of a responsive side 305 to a backing side 310. The responsive side 305, or at least a portion thereof, is preferably responsive to root exudate from a root system of the crops 120. In alternative embodiments, the responsive side 305 releases water, liquefied nutrients, and/or other fluids based primarily on fluid supply pressure or a combination of supply pressure and other factors. The backing side 310 is a supporting structure. In the embodiment illustrated in FIG. 3, the resulting delivery tube 115 is essentially a "tape-like" or "lay flat" structure when not in use. The tape-like format is advantageous because the delivery tube 115 can be compactly spooled (reeled) for storage and distribution. The responsive side 305 includes a substrate that is treated with a hydrophilic polymer solution to make it responsive to root exudates. The substrate preferably includes a nonwoven fabric of petroleum-based plastic polymers, for instance polyethylene (PE) or polypropylene (PP).

Acceptable nonwoven PE fabrics for the responsive side 305 include, for instance, DuPont Tyvek (1025BL, 1025D, 1053B, 1053D, 1056D, 1058D, 1059B, 1073B, 1073D, 1079, 1079B, 1079D, or 1085D). Suitable nonwoven PP fabrics for the responsive side 305 include, for example, Fibertex Spuntex 55, Hanes Imperial RB2, Mitsui Chemicals, Suzhou Mediceng (LB543 or WH001F), and related products. Other PE and PP fabrics may also be suitable substrates, according to application demands.

The responsive side 305 may be treated or untreated, according to application needs. Suitable hydrophilic polymers for treating the responsive side 305 include various Polyhydroxystyrene (PHS) co-polymers, for example, Polyhydroxystyrene-Novolak (PHS-Novolak), Polyhydroxystyrene-Benzotriazole (PHS-BZT), and Polyhydroxystyrene Hydroxyethyl Methacrylate (PHS-HEMA). Other hydrophilic polymers may also be used.

The backing side 310 may be or include, for example, Metallocene Polyethylene (PE) from Brentwood Plastics, Inc., Low-Density Polyethylene (LDPE), Linear Low Density Polyethylene (LLDPE), Copolymer polypropylene (PP) by Bloomer Plastics Inc. (BPI) (e.g., the "random" and "impact" products), Homopolymer polypropylene (PP) by BPI, Polyester (PET or polyethylene terephthalate), and Urethane Film by Medco Coated Products (a division of Medco Labs). Any of the nonwoven PE or PP fabrics listed above as being suitable for the responsive side 305 could also be used for the backing side 310. Other materials could also be used for the backing side 310. The general requirements for the material used for the backing side 310 are that it is water-proof, weldable (bondable), reasonably durable for the target application, and low cost. The backing side 310 material may have a thickness, for example, in the range of 2 to 15 mils.

Various combinations of responsive side 305 and backing side 310 materials as possible for the manufacture of delivery tubes. Preferably, a treated responsive side 305 is paired with a backing side 310. For example, Dupont Tyvek or another nonwoven PE fabric that has been treated with a hydrophilic polymer (the treated responsive side 305) could be paired with untreated Dupont Tyvek or another nonwoven PE fabric (the backing side 310). Alternatively, untreated Dupont Tyvek (the responsive side 305) could be paired with another untreated nonwoven PE fabric (the backing side) to form a delivery tube. The pairing of similar fabrics (e.g., two PE fabrics or two PP fabrics) may be preferable because it generally produces stronger bonds than the pairing of dissimilar fabrics.

In embodiments with a treated responsive side 305, the responsive side 305 requires hydrophilic treatment processing before it is assembled to an untreated backing side 310. Such an assembly may be less expensive than a delivery tube formed entirely of treated material, however. The backing side 310 can also improve the durability of the delivery tube 115 compared to a delivery tube that is formed entirely of responsive material that has been treated with hydrophilic polymers.

Various configurations of the delivery tube 115 are described below with reference to FIGS. 4-8.

Figure 4:
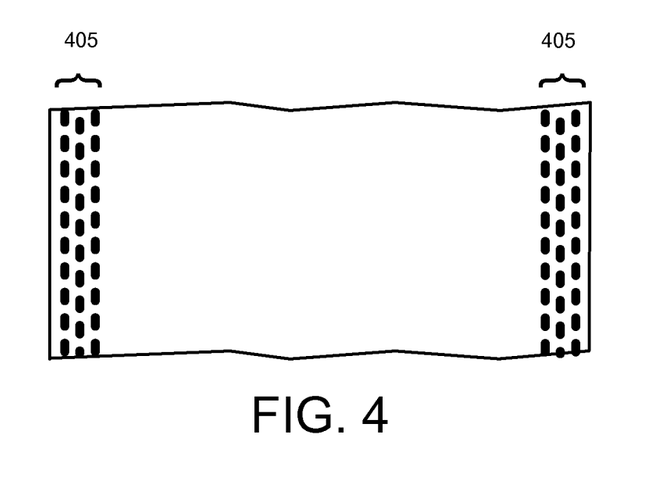
FIG. 4 is a plan view of a delivery tube, according to an embodiment of the invention.

FIG. 4 is a plan view of a delivery tube, according to an embodiment of the invention. Weld areas 405 bond edges of the responsive side 305 to corresponding edges of the backing side 310. The weld areas 405 provide a fluidic seal to contain water or an aqueous solution in an interior cavity of the delivery tube 115. The delivery tube 115 is intended for relatively low pressure systems. Preferably, the seal formed by weld areas 405 should withstand a burst pressure of at least 4.0 PSI. In the illustrated embodiment, each weld area 405 includes three rows of intermittent welds, the three rows being staggered with respect to each other. Other weld patterns (intermittent or continuous) are possible.

Figure 5:
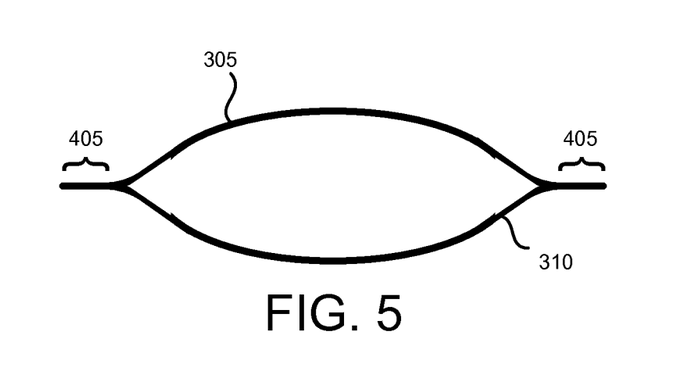
FIG. 5 is an end view of a partially-opened delivery tube, according to an embodiment of the invention.

FIG. 5 is an end view of a partially-opened delivery tube, according to an embodiment of the invention. In the illustrated embodiment, the responsive side 305 may be saturated with a hydrophilic polymer solution over the full width shown in cross-section.

Figure 6:
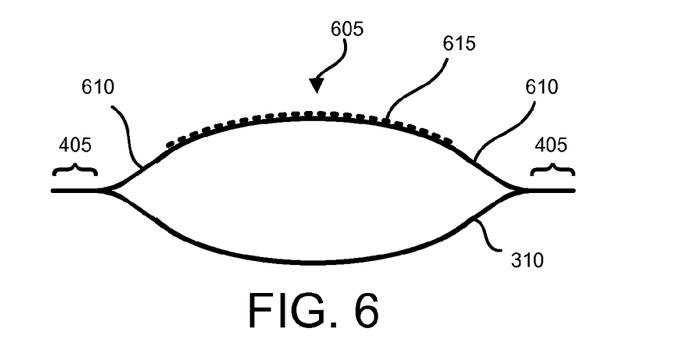
FIG. 6 is an end view of a partially-opened delivery tube, according to an embodiment of the invention.

FIG. 6 is an end view of a partially-opened delivery tube, according to an embodiment of the invention. In the illustrated embodiment, the hydrophilic polymer is disposed on a coated portion 615 of an outer surface of the substrate 605. Uncoated portions 610 of the substrate 605 extend into the weld areas 405. In one respect, the configuration shown in FIG. 6 may be advantageous because uncoated portions 610 of the substrate 605 may result in stronger weld areas 405. Selective pattern coating on a surface of the substrate 605 also reduces manufacturing cost relative to saturation coating at least because less hydrophilic polymer may be required.

Figure 7:
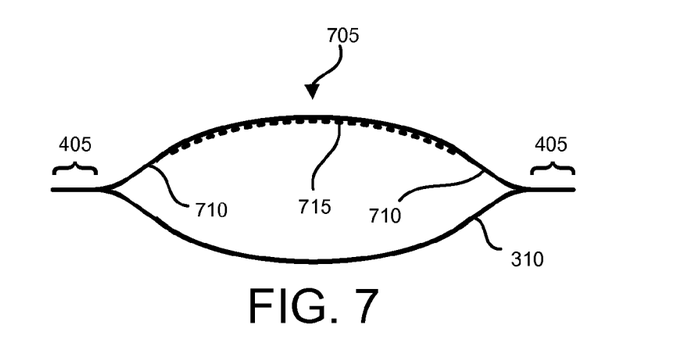
FIG. 7 is an end view of a partially-opened delivery tube, according to an embodiment of the invention.

FIG. 7 is an end view of a partially-opened delivery tube, according to an embodiment of the invention. In the illustrated embodiment, the hydrophilic polymer is disposed on a coated portion 715 of an inner surface of the substrate 705. Uncoated portions 710 of the substrate extend into the weld areas 405. The configuration shown in FIG. 7 may also be advantageous because uncoated portions 710 of the substrate 705 may result in stronger weld areas 405. Selective pattern coating on a surface of the substrate 705 also reduces manufacturing cost relative to saturation coating at least because less hydrophilic polymer may be required.

Figure 8:
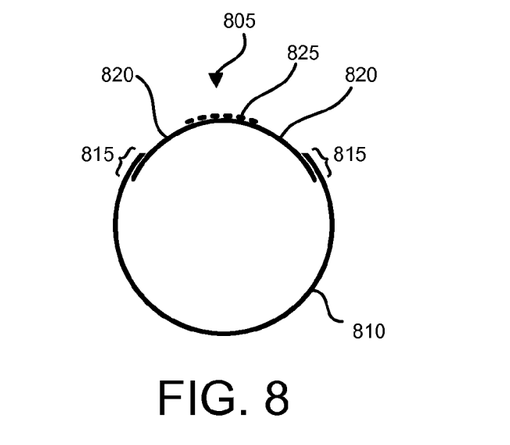
FIG. 8 is an end view of a delivery tube, according to an embodiment of the invention.

FIG. 8 is an end view of a delivery tube, according to an embodiment of the invention. As shown therein, a delivery tube with a circular cross-section includes a substrate 805 connected to a backing 810 at overlap welds 815. In the illustrated embodiment, the substrate 805 forms less than 50% of the delivery tube. The substrate 805 includes a coated portion 825 and uncoated portions 820. The coated portion 825 represents hydrophilic polymer disposed on an outer surface of the substrate 805. The uncoated portions 820 extend into the overlap weld areas 815. The ratio between the substrate 805 and the backing 810 could be varied according to design choice. Decreasing the size of the coated portion 825 and/or the dry polymer weight applied to the coated portion 825 decreases the amount of water or fertilizer solution that is released at a given pressure.

Manufacturing Method

A manufacturing process for the delivery tube 115 is described with reference to FIGS. 9-14.

Figure 9:
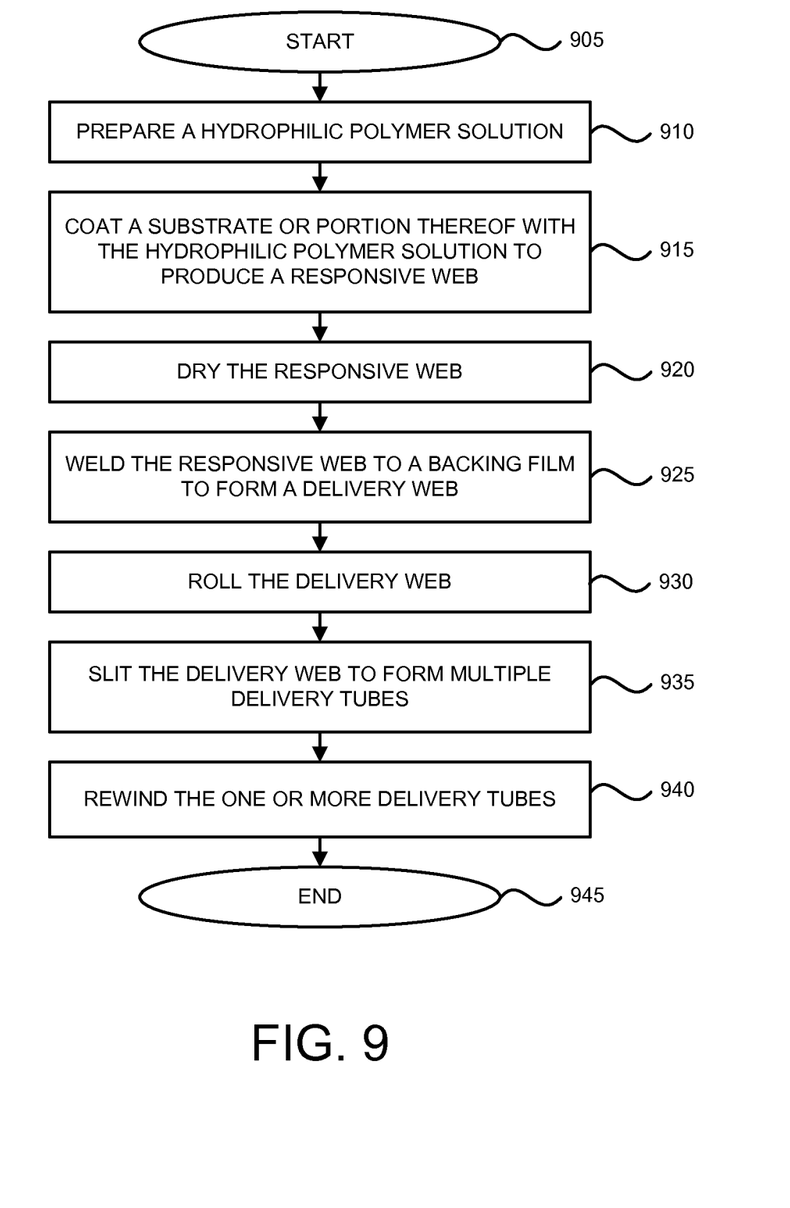
FIG. 9 is a flow diagram of a method for manufacturing a delivery tube, according to an embodiment of the invention.

FIG. 9 is a flow diagram of a method for manufacturing a delivery tube, according to an embodiment of the invention. As shown therein, the process begins in step 905 and then prepares a hydrophilic polymer solution in step 910. Step 910 may include, for instance mixing a dry hydrophilic polymer powder with a solvent such as Isopropanol 99% (IPA). The concentration of hydrophilic polymer in the solution may be based, for instance, on the target substrate material, the desired concentration of dry hydrophilic polymer on the substrate, and the coating method used. Suitable concentrations of hydrophilic polymer in the solution may be in the range of 2.0-89.0 weight/volume percent, and are preferably in excess of 20 wt/vol % to facilitate high-speed coating methods which reduce evaporation and minimize production costs.

In step 915, the process coats a substrate (or portion thereof) with the hydrophilic polymer solution to produce a responsive web. As used herein, a "coating" step could be a surface treatment, saturation, or other application of the hydrophilic polymer solution to the nonwoven substrate material. The process dries the responsive web in step 920. The desired concentration of dry hydrophilic polymer on the substrate will vary according to the substrate material and other factors. As an example, polymer weights in the range of 1.5-5.2 g/m$^2$ have produced acceptable results with Tyvek PE substrates.

Next, the process welds the responsive web to a backing film to form a delivery web in step 925. Welding step 925 could be or include, for example, rotary heat sealing, contact welding, ultrasonic welding, or other plastic welding method. The delivery web is then rolled (spooled) in step 930.

Figure 13:
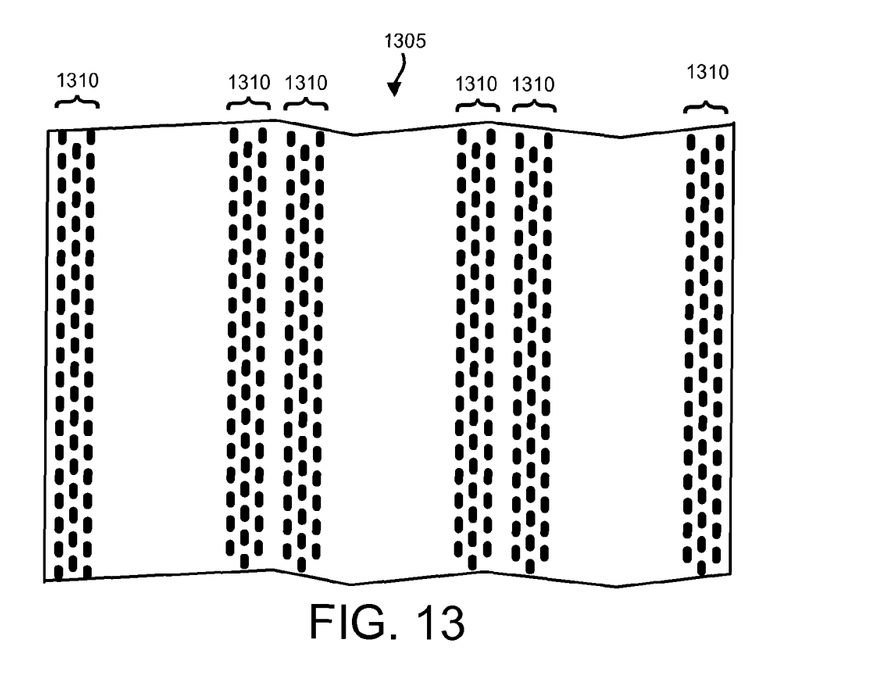
FIG. 13 is a plan view of a delivery web subsequent to a welding step, according to an embodiment of the invention.
Figure 14:
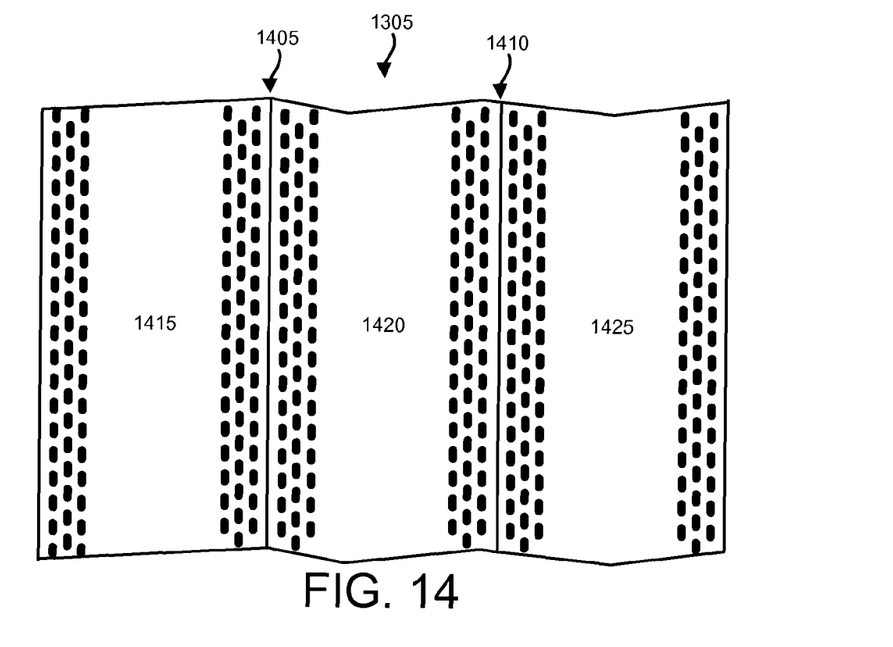
FIG. 14 is a plan view of a three delivery tubes, according to an embodiment of the invention.

Preferably, steps 915-930 produce a multi-paneled delivery web. In this instance, the process slits the delivery web to form multiple delivery tubes in step 935 and then rewinds each of the multiple delivery tubes in step 940 before terminating in step 945. FIGS. 13 and 14 illustrate and exemplary multi-paneled delivery web. Slitting step 935 may utilize, for example, one or more razors, one or more pairs of opposing circular knives, or a slit weld. Rewind step 940 may include rewinding each of the manufactured delivery tubes onto a reel at a desired speed and capacity.

Variations to the manufacturing method described above with reference to FIG. 9 are possible. For instance, in embodiments where the responsive side 305 of the delivery tube is untreated, steps 910, 915, and 920 are not required. Rolling step 930 may not be required for a continuous manufacturing flow. Slitting step 935 and rewind step 940 may be, and preferably are, combined into a single process step. In addition, where steps 915-925 produce a single-tube-width web rather than a multi-paneled web, steps 935 and 940 are not required at all. Exemplary coating methods for step 915 are presented below with reference to FIGS. 10-12, although other coating methods could be used in the alternative.

Figure 10:
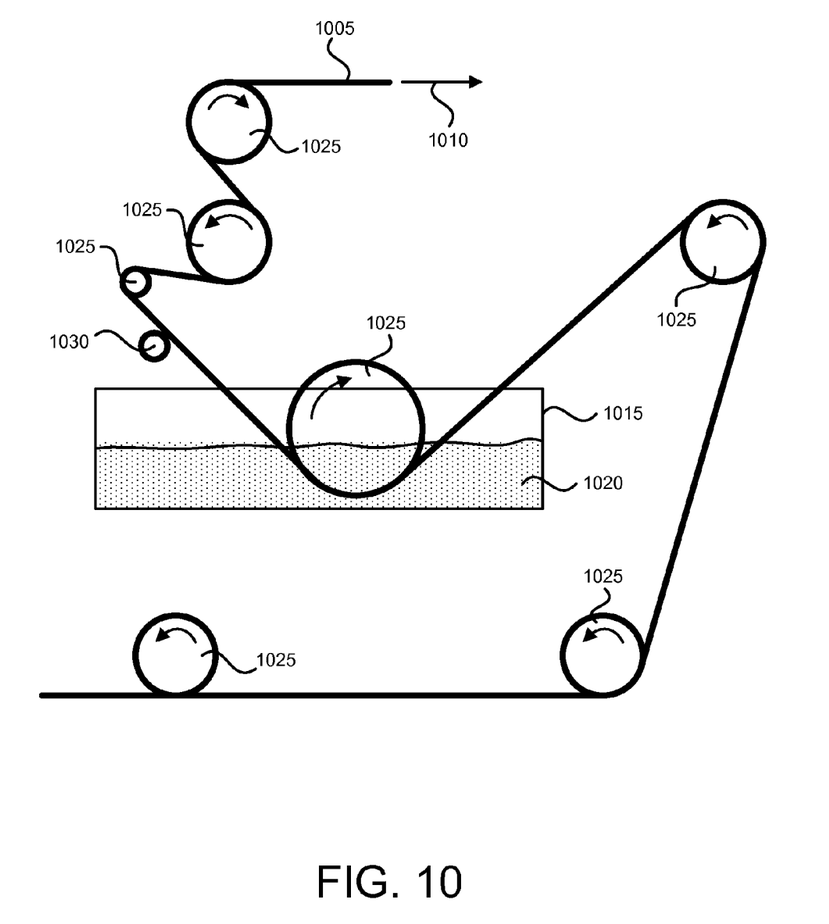
FIG. 10 is a schematic diagram of a coating apparatus, according to an embodiment of the invention.

FIG. 10 is a schematic diagram of a coating apparatus, according to an embodiment of the invention. As illustrated, the coating apparatus is configured so that a substrate web 1005 can move in a direction 1010 in cooperation with pulleys 1025 and a Mayer rod (a/k/a a rod doctor) 1030. A coating pan 1015 contains a hydrophilic polymer solution 1020. In operation, the substrate web 1005 is dip coated with the hydrophilic solution 1020. The Mayer rod 1030 operates to remove excess hydrophilic solution 1020 after the substrate web 1005 has exited the coating pan 1015.

Variations to the dip-coating apparatus illustrated in FIG. 10 are possible. For instance the number and placement of the rollers 1025 can vary according to design choice. In addition, the use of a Mayer rod 1030 is optional.

Figure 11:
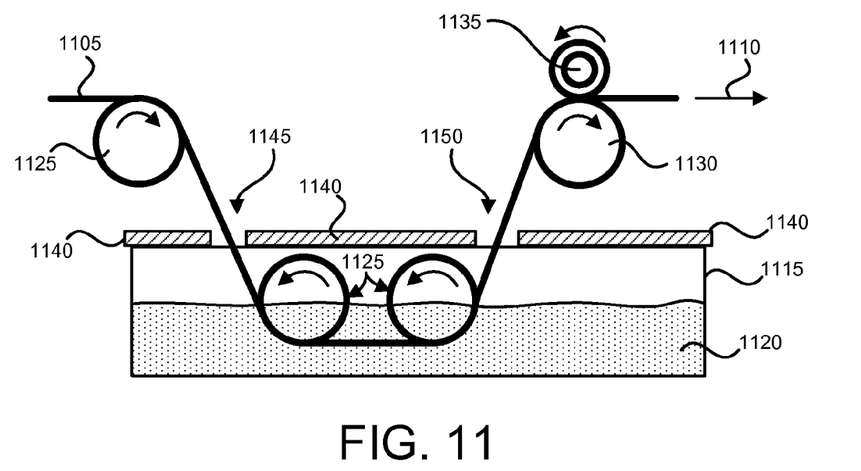
FIG. 11 is a schematic diagram of a coating apparatus, according to an embodiment of the invention.

FIG. 11 is a schematic diagram of a coating apparatus, according to an embodiment of the invention. As shown therein, the coating apparatus is configured so that a substrate web 1105 can advance in a direction 1110 in cooperation with pulleys 1125, steel roller 1130 and rubber roller 1135. A coating pan 1115 contains a hydrophilic polymer solution 1120 and is at least partially covered by a lid 1140. In operation, the substrate web 1110 passes through openings 1145 and 1150 in the lid 1140 and is dip coated with the hydrophilic solution 1120. The lid 1140 advantageously limits evaporation of solvent in the hydrophilic solution 1120. The rubber roller cooperates with the steel roller 1130 to remove excess hydrophilic solution 1120 after the substrate web 1105 has exited the coating pan 1115.

Variations to the configuration of the dip-coating apparatus illustrated in FIG. 11 are possible. For instance the number and placement of the rollers 1125 can vary according to design choice. In addition, the use of a rubber roller 1135 is optional.

Figure 12:
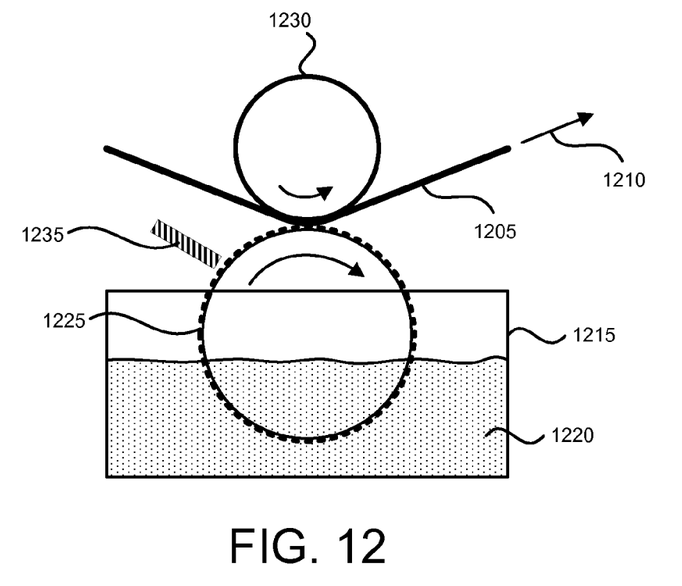
FIG. 12 is a schematic diagram of a coating apparatus, according to an embodiment of the invention.

FIG. 12 is a schematic diagram of a coating apparatus, according to an embodiment of the invention. The coating apparatus is configured so that a substrate web 1205 can progress in a direction 1210 between opposing rollers 1225 and 1230. The roller 1225 is a gravure roller having an engraved (or etched) surface. The gravure roller 1225 is partially submerged in hydrophilic polymer solution 1220 that is contained by the coating pan 1215. Roller 1230 is a pressure roller configured to place a downward force on the substrate web 1205. A scraper (doctor) blade is disposed adjacent to the gravure roller 1225. In operation, the gravure roller 1225 picks up hydrophilic polymer solution 1220 in its engraved (or etched) surface. The scraper blade 12235 removes excess hydrophilic polymer solution 1220 from a surface of the gravure roller 1225. Remaining hydrophilic polymer solution 1220 is deposited from the engraved (or etched) cavities of the gravure roller 1225 to at least a portion of a surface of the substrate web 1205.

FIG. 13 is a plan view of a delivery web subsequent to a welding step, according to an embodiment of the invention. FIG. 13 illustrates a delivery web 1305, for instance, after the welding step 925 described above with reference to FIG. 9. In the embodiment shown in FIG. 13 the delivery web 1305 includes six linear weld areas 1310, each of the weld areas 1310 including three staggered rows of intermittent welds. The weld patterns in each of the weld areas 1310 could vary from what is shown.

FIG. 14 is a plan view of a three delivery tubes, according to an embodiment of the invention. FIG. 14 illustrates the delivery web 1305, for instance, after the slitting step 935 described above with reference to FIG. 9. As shown, slit lines 1405 and 1410 separate the delivery web 1305 into three delivery tubes 1415, 1420, and 1425.

Although FIGS. 13 and 14 illustrate a 3-panel approach, a manufacturing process that is configured for a greater or lesser numbers of panels is also possible.

EXAMPLES

Preferably, delivery tubes are fabricated with a PE substrate and PE backing, or with a PP substrate and a PP backing. Example delivery tubes have been fabricated consistent with the configuration illustrated in FIGS. 3-5. A first group of samples used Tyvek 1059B PE substrates with a basis weight of 64.4 gsm and a thickness range of 2.9 to 10.1 mils. A second group of samples used Tyvek 1073 PE substrates with a basis weight of 74.6 gsm and a thickness range of 3.5 to 11.1 mils. Samples from both groups were coated using a gravure coating process to apply a dry hydrophilic polymer coating at a weight of 5.0 to 5.3 gsm. The coated PE substrates were bonded to a 5.0 mil thick Metallocene PE backer via ultrasonic weld or rotary heat seal. The resulting delivery tubes had an internal diameter of ⅝ to ⅞ inches. In agricultural testing, the tubes were observed to be structurally robust and locally responsive to plant hydration and nutrition needs.

SUMMARY

This specification has thus described an improved irrigation and fertilization delivery tube, a method for manufacturing the delivery tube, and exemplary systems utilizing the delivery tube. As described above, embodiments of the invention utilize low-cost materials and high-throughput manufacturing processes to produce a responsive delivery tube. The result is a delivery tube that can be sold at an affordable end-user price. The disclosed delivery tube is also highly durable in use. Embodiments of the invention enable a highly-efficient plant-responsive irrigation and fertilization delivery system that is comparable in total life cycle cost to less-efficient non-responsive drip irrigation systems. Other embodiments provide delivery tubes that are responsive to regulated supply pressure and/or other factors. The improved systems, delivery tubes, and manufacturing processes disclosed in this application can ultimately benefit both small-plot and commercial farms.

It will be apparent to those skilled in the art that modifications and variations can be made to the tube, its manufacturing method, and/or its use in a system without deviating from the spirit or scope of the invention disclosed herein.

We claim:

1. A delivery tube, comprising:
a substrate, a portion of the substrate being treated with a hydrophilic polymer, the substrate including nonwoven polyethylene; and
a backer welded to the substrate at a first weld area and a second weld area, the first and second weld areas extending over the functional length of the delivery tube, the backer including nonwoven polyethylene, the delivery tube being configured such that the substrate and the backer are each disposed along a functional length of the delivery tube, a lumen of the delivery tube being formed between at least a portion of the substrate and at least a portion of the backer, the portion of the substrate being treated with the hydrophilic polymer excluding the first and second weld areas.

2. The delivery tube of claim 1, wherein each of the first and second weld areas include first and second rows of intermittent welds, the first row of intermittent welds being staggered with respect to the second row of intermittent welds.

3. The delivery tube of claim 2, wherein each of the first and second weld areas further include a third row of intermittent welds, the third row of intermittent welds being staggered with respect to at least one of the first and second rows of intermittent welds.

4. The delivery tube of claim 1, each of the first and second welds areas including a rotary heat seal.

5. The delivery tube of claim 1, each of the first and second welds areas including a continuous weld.

6. A delivery tube, comprising:
a substrate; and
a backer welded to the substrate at a first weld area and a second weld area, the first and second weld areas extending over the functional length of the delivery tube, the delivery tube being configured such that the substrate and the backer are each disposed along a functional length of the delivery tube, a lumen of the delivery tube being formed between at least a portion of the substrate and at least a portion of the backer, each of the first and second weld areas including a first and second row of intermittent welds, the first row of intermittent welds being staggered with respect to the second row of intermittent welds.

7. The delivery tube of claim 6, wherein each of the first and second weld areas further includes a third row of intermittent welds, the third row of intermittent welds being staggered with respect to at least one of the first and second rows of intermittent welds.

8. The delivery tube of claim 6, each of the first and second welds areas including a rotary heat seal.

9. A delivery web, comprising:
a substrate; and
a backer welded to the substrate at a plurality of weld areas, each of the plurality of weld areas extending over the functional length of the delivery web, the delivery web being configured such that the substrate and the backer are each disposed along a functional length of the delivery web,
a first lumen of the delivery web being formed between a first portion of the substrate, a first portion of the backer, and a first and second of the plurality of weld areas,
a second lumen of the delivery web being formed between a second portion of the substrate, a second portion of the backer, and a third and fourth of the plurality of weld areas, the web being configured such that fluid communication is not possible between the first lumen and the second lumen.

10. The delivery web of claim 9, further comprising a third lumen of the delivery web being formed between a third portion of the substrate, a third portion of the backer, and a fifth and sixth of the plurality of weld areas, the web being configured such that fluid communication is not possible between any two or more of the first, second, and third lumens.

11. The delivery web of claim 9, wherein a portion of the substrate is treated with a hydrophilic polymer.

12. The delivery web of claim 11, wherein the portion of the substrate treated with the hydrophilic polymer excludes the plurality of weld areas.

13. The delivery web of claim 9, wherein each of the plurality of weld areas includes first, second, and third rows of intermittent welds, the first row of intermittent welds being staggered with respect to the second row of intermittent welds, the third row of intermittent welds being staggered with respect to at least one of the first and second rows of intermittent welds.

14. The delivery web of claim 9, each of the plurality of welds areas including a rotary heat seal.

15. The delivery web of claim 9, each of the plurality of welds areas including a continuous weld.

* * * * *